United States Patent [19]

Knothe et al.

[11] Patent Number: 4,494,620

[45] Date of Patent: Jan. 22, 1985

[54] ELECTRIC BALANCE

[75] Inventors: Erich Knothe, Bovenden; Franz-Josef Melcher, Hardegsen; Eberhard Stadler, Göttingen; Rainer Exner, Wollbrandshausen, all of Fed. Rep. of Germany

[73] Assignee: Sartorius GmbH, Fed. Rep. of Germany

[21] Appl. No.: 530,258

[22] Filed: Sep. 8, 1983

[30] Foreign Application Priority Data

Sep. 16, 1982 [DE] Fed. Rep. of Germany ....... 3234372

[51] Int. Cl.³ .................... G01G 19/22; G01G 21/12; G01G 21/24
[52] U.S. Cl. ..................................... 177/25; 177/212; 177/255
[58] Field of Search .................. 177/25, 212, 255, 173

[56] References Cited

U.S. PATENT DOCUMENTS

| 3,566,983 | 3/1971 | Weickhardt | 177/173 |
| 4,258,811 | 3/1981 | Franzon | 177/255 X |
| 4,341,275 | 7/1982 | Stadler et al. | 177/212 |
| 4,401,173 | 8/1983 | Komoto | 177/255 X |

FOREIGN PATENT DOCUMENTS 669210  6/1979  U.S.S.R. ............... 177/255

Primary Examiner—E. A. Goldberg
Assistant Examiner—Patrick W. Foster
Attorney, Agent, or Firm—Eric P. Schellin

[57] ABSTRACT

An electric inclination meter is built into a high-resolution electric balance with a measured value receiver, a microprocessor for digital signal processing and with a digital display. This inclination meter compensates the inclination-dependent errors of the balance. The inclination meter can have a movable suspended mass or it can have a container which is partially filled with liquid, thus forming a gas bubble. The positional deviation of the movable elements can be picked up optically or inductively.

7 Claims, 3 Drawing Figures

ELECTRIC BALANCE

FIELD OF THE INVENTION

The invention concerns a high-resolution electric balance with a measured value receiver, a microprocessor for digital signal processing and a digital display.

BACKGROUND OF THE INVENTION

The known balances of this type must be aligned horizontally after every change of their location, while observing the built-in bubble. This is usually accomplished by changing the height of at least two of the feet of the balance. This horizontal alignment must be rather precise, since, for example, an erroneous setting of only 0.5 angular degrees in a balance with a resolution of $10^6$ d at maximum load results in an error of 40 d. However, this procedure is rather complicated and therefore a nuisance when the location is frequently changed. In addition, a change of location in balances which have a maximum load over a few kilograms frequently occurs when the load is positioned due to the yielding quality of the surface of the location. This load-dependent deviation from a horizontal alignment is usually not observed by the operating person and therefore leads to measuring errors.

The invention therefore has the task of improving a balance of the type initially indicated so that deviations from the normal horizontal position provided have no effect on the result.

The invention accomplishes this as follows: An electric inclination meter is built into the balance which compensates the inclination-dependent errors of the balance.

These and further constructional and operational characteristics of the invention will be evident from the detailed description given hereinafter with reference to the figures of the accompanying drawings which illustrate preferred embodiments and alternatives by way of non-limiting examples.

DESCRIPTION OF THE PREFERRED EMBODIMENT

Figure 1:
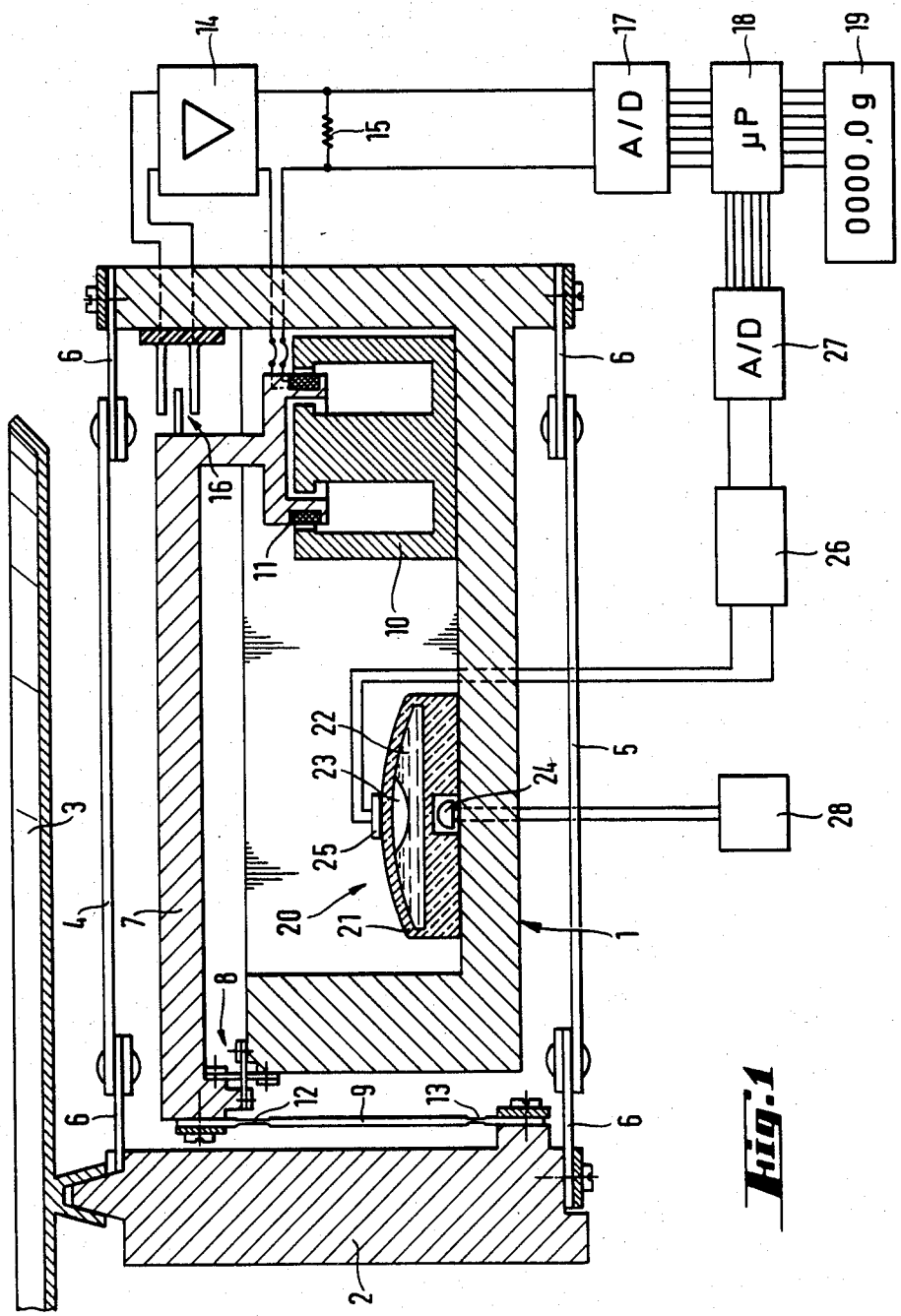
FIG. 1 shows the essential parts of an electric balance with an inclination meter in section.

Referring now to the drawings wherein reference numerals are used to designate parts throughout the various figures thereof, there is shown in FIG. 1 the electromagnetic balance mechanism consisting of support part 1 fixed to the housing, to which part load receiver 2 is fastened over two guide rods 4 and 5 with articulations 6 so that it can move vertically. The load receiver carries load scale 3 at its top for receiving the material to be weighed and transfers the force corresponding to the mass of the material being weighed over coupling element 9 with thin areas 12 and 13 to the shorter lever arm of transfer lever 7. Transfer lever 7 is mounted by cross spring joint 8 to support part 1. The compensation force attacks the longer lever arm of transfer lever 7, which force is produced by current-carrying coil 11 in the air gap of a permanent magnet system. The magnitude of the compensation current is regulated in a known manner by position sensor 16 and variable-gain amplifier 14 in such a manner that there is an equilibrium between the weight of the material being weighed and the electromagnetic compensation force. The compensation current produces a measuring voltage at measuring resistor 15 which is fed to digitizer 17. The digitized result is taken by microprocessor 18 and digitally displayed in display 19.

Electric inclination meter 20 is built into the balance. It consists of transparent container 21, which is partially filled with liquid 22 so that gas bubble 23 is formed at the highest point in container 21. Due to the curvature of the upper limiting surface of container 21, the position of gas bubble 23 is dependent on the oblique position of the balance. This curvature is exaggerated in the figure for the sake of clarity. Luminous diode 24 is centrally located under container 21 and sends its emitted radiation vertically upward through the lower container wall, liquid 22, gas bubble 23 and the upper container wall. There, the non-absorbed radiation is registered by axially symmetrical, photosensitive receiver 25, e.g., a photodiode, which is also centrally located. Liquid 22 is selected or dyed so that it partially absorbs the radiation of the luminous diode in order that the amount of radiation which arrives at photosensitive receiver 25 is heavily dependent on the depth of the liquid it passes through and thus on the position of gas bubble 23. Luminous diode 24 is supplied with a constant current by current supply unit 28. The output signal of photosensitive receiver 25 is amplified in amplifier 26 and digitized in digitizer 27. Microprocessor 18 can then calculate the oblique position of the balance from this signal and the known characteristic line of the inclination meter and correspondingly correct the measured value of the weighing system, which is supplied from digitizer 17.

It is assumed that inclination recorder 20 is set in such a manner in relation to housing 1 of the weighing system that when gas bubble 23 is in a central position, the direction of measuring of the weighing system coincides with the vertical direction. Then, a deviation of the measured result of the weighing system is dependent only on the magnitude of the oblique position and not on the direction of this oblique position. The same holds true for the signal of photosensitive receiver 25, which is independent of the direction of migration of gas bubble 23.

Figure 2:
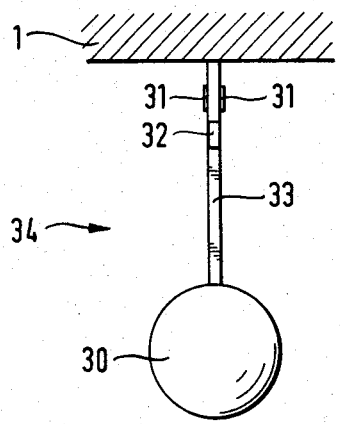
FIG. 2 shows another embodiment of an inclination meter.

Another embodiment of the electric inclination meter is shown in FIG. 2. Here, a mass in the form of a ball 30 is movably suspended on thin rod 33 with a quadratic section. In an oblique position, rod 33 is stressed by bending, which bending is converted into an electric signal by bonded wire strain gauges 31 in the one direction and 32 in the direction vertical thereto in a manner which is known and therefore not shown in the figure. These two signals are, as in FIG. 1, amplified, digitized and supplied to microprocessor 18. There, both the magnitude and the direction of the oblique position can be calculated from the two signals. This is advantageous, for example, if the zero point of the balance is to be compensated along with the sensitivity. As a result of the asymmetrical construction of parallel guide system 2, 4 and 5 and of transfer lever 7 of the balance in FIG. 1, an oblique position has a varyingly strong effect on the zero point parallel or vertical to the axis of rotation of transfer lever 7 and guide rods 4 and 5. Thus, both the zero point and the sensitivity of the balance can be corrected with inclination meter 34 of FIG. 2 even if they are dependent on different directions.

Figure 3:
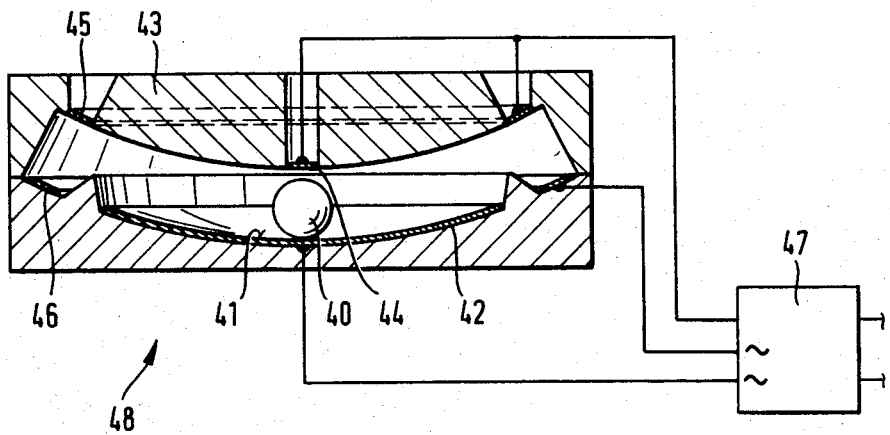
FIG. 3 shows a further embodiment of an inclination meter.

FIG. 3 shows a further embodiment of the electric inclination meter. A ball 40 seeks its stable (lowest) position on concave surface 41. The curvature is again exaggerated in the figure for the sake of clarity. Upper cover 43 prevents the ball from falling out during transport. The position of the ball is picked up capacitively: Electrode 44 together with large-area electrode 42 on concave surface 41 including ball 40 forms a capacitor with inclinatin-dependent capacity. Annualr electrode 45 and annular counterelectrode 46 form a constant reference capacity. The relationship of the two capacities is measured in an alternating voltage bridge circuit. This compensates temperature effects and, for example, the moisture dependency of the dielectric constants of the air. Electronic block 47 contains the alternating voltage generator for feeding the bridge and also contains the evaluation circuit for detuning the bridge. It emits a direct voltage signal which is fed, as in FIG. 1, over a digitizer to the microprocessor. In a rotationally symmetric arrangement of the electrodes the output signal of inclination meter 48 is independent of the direction of the oblique position, just as in the construction of the inclination meter according to FIG. 1.

The inclination meters shown in the figures are given as possible embodiments. Other embodiments of the inclination meter are of course possible. Thus, for example, the positional deviation of the ball in FIG. 3 can be measured by other known methods such as optical or inductive methods.

This invention is not limited to the preferred embodiments and alternative heretofore described, to which variations and improvements may be made, consisting of mechanically and electrically equivalent modifications to component parts and procedures without leaving the scope of the present invention, the characteristics of which are summarized in the following claims.

What is claimed is:

1. A high resolution electronic balance comprising:
   an electromagnetic balance movement;
   a microprocessor for digital signal processing, receiving signals from said movement;
   a signal display for signals from said microprocessor; and
   an electric inclination meter built into the housing of said balance, the signals from said meter being input to said microprocessor to compensate the inclination-dependent errors of the balance movement.

2. A high resolution electronic balance according to claim 1 where the electric inclination meter contains a movably suspended mass.

3. A high resolution electronic balance according to claim 1 where the electric inclination meter has a container which is partially filled with liquid thus forming a gas bubble.

4. A high resolution electronic balance according to claim 3 where optical means are present for picking up the position of the gas bubble.

5. A high resolution electronic balance according to claim 1 where the electric inclination meter contains a ball whose stable position of equilibrium varies in dependency on the inclination of a concave surface.

6. A high resolution electronic balance according to claim 1 where the output signal of the electric inclination meter can be used by the microprocessor to connect the sensitivity and zero point of the balance.

7. A high resolution electronic balance according to claims 1, 2, 3, 4, 5 or 6 where the output signal of the electric inclination meter is digitized and fed to the microprocessor for the digital connecting of the inclination-dependent errors of the balance.

* * * * *